(12) United States Patent
Gassmann et al.

(10) Patent No.: US 11,279,349 B2
(45) Date of Patent: Mar. 22, 2022

(54) SAFETY MODULE, AUTOMATED DRIVING SYSTEM, AND METHODS THEREOF

(71) Applicant: Intel Corporation, Santa Clara, CA (US)

(72) Inventors: Bernd Gassmann, Straubenhardt (DE); Cornelius Buerkle, Karlsruhe (DE); Fabian Oboril, Karlsruhe (DE)

(73) Assignee: INTEL CORPORATION, Santa Clara, CA (US)

(*) Notice: Subject to any disclaimer, the term of this patent is extended or adjusted under 35 U.S.C. 154(b) by 163 days.

(21) Appl. No.: 16/583,280

(22) Filed: Sep. 26, 2019

(65) Prior Publication Data

US 2020/0017102 A1 Jan. 16, 2020

(51) Int. Cl.
*B60W 30/09* (2012.01)

(52) U.S. Cl.
CPC ......... *B60W 30/09* (2013.01); *B60W 2554/00* (2020.02)

(58) Field of Classification Search
CPC ............ B60W 2420/42; B60W 10/20; B60W 30/0956; B60W 10/18; B60W 2420/52; B60W 2554/00; B60W 2710/18; B60W 30/09; B60W 2520/10; B60W 2552/53; B60W 2555/60; B60W 2710/20; B60W 10/04; B60W 2552/30; B60W 2720/10; B60W 30/12; B60W 40/06; B60W 60/001; B60W 2520/06; B60W 2554/80; B60W 2554/804; B60W 2556/50; B60W 2720/106; B60W 2754/20; B60W 2754/30; B60W 30/095; B60W 30/0953;
(Continued)

(56) References Cited

U.S. PATENT DOCUMENTS

2004/0230351 A1* 11/2004 Rumbo ................ G05D 1/0202
701/3
2005/0004745 A1* 1/2005 Rumbo ................ G01C 21/20
701/532

(Continued)

FOREIGN PATENT DOCUMENTS

DE 102015209974 A1 12/2016

OTHER PUBLICATIONS

International Search Report based on application No. PCT/US2020/044915 (16 pages) dated Nov. 13, 2020 (Reference Purpose Only).

(Continued)

*Primary Examiner* — Alexander G Kalinowski
*Assistant Examiner* — Sanjeev Malhotra
(74) *Attorney, Agent, or Firm* — Viering, Jentschura & Partner mbB

(57) ABSTRACT

According to various aspects, a safety module is described including: one or more processors configured to receive road information representing a geometry of one or more roads in a Cartesian coordinate system, determine a lane coordinate system based on the received road information, the lane coordinate system including a plurality of lane segments arranged along a longitudinal direction and along a lateral direction of the lane coordinate system, wherein a length information and a width information are assigned to each of the lane segments, and determine a potential collision event based on the lane coordinate system.

20 Claims, 8 Drawing Sheets

(58) Field of Classification Search
CPC .............. B60W 30/14; B60W 30/18; B60W 30/18154; B60W 30/18163; B60W 40/02; B60W 40/04; B60W 40/072; B60W 40/105; B60W 50/14; B60W 60/0015; G05D 1/0088; G05D 2201/0213; G05D 1/0246; G05D 1/0221; G05D 1/0278; G05D 1/0214; G05D 1/0212; G05D 1/0251; G05D 1/0253; G05D 1/0274; G05D 1/0287; G05D 1/0219; G06K 9/00798; G06K 9/00791; G06K 9/00818; G06K 9/00825; G06K 9/00805; G06K 9/3258; G06T 2207/30256; G06T 2207/10016; G06T 2207/10024; G06T 2207/10028; G06T 2207/20081; G06T 2207/30261; G06T 7/00; G06T 7/70; G06T 7/73; G06T 7/74; G08G 1/167; G08G 1/09623; G08G 1/0012; G08G 1/096725; G08G 1/096805; G08G 1/163; G08G 1/166; G01C 21/3407; G01C 21/3602; G01C 21/28; G01C 21/32; G01C 21/3658; G01C 21/36; G01C 21/3691; G01C 21/14; G01C 21/165; G01C 21/30; G01C 21/34; G01C 21/3476; G01C 21/3623; G01C 21/3644; G01C 21/3815; G01C 21/3822; G01C 13/931; G01S 19/48; G01S 13/867; G01S 19/10; G01S 2013/9323; B62D 15/025; H04L 67/12; B60T 2201/022; B60T 7/12; B60T 7/22; G06F 16/29; H04W 4/44
USPC ................. 701/26, 409, 3, 532; 382/103
See application file for complete search history.

(56) References Cited

U.S. PATENT DOCUMENTS

| | | | | |
|---|---|---|---|---|
| 2012/0271540 A1* | 10/2012 | Miksa | ............... | B60W 30/12 701/409 |
| 2016/0335892 A1* | 11/2016 | Okada | ............... | G08G 1/123 |
| 2017/0008521 A1* | 1/2017 | Braunstein | ........... | G01C 21/165 |
| 2018/0024562 A1* | 1/2018 | Bellaiche | .............. | G06T 7/73 701/26 |
| 2018/0025235 A1* | 1/2018 | Fridman | ............... | G06T 7/11 382/103 |
| 2018/0188059 A1* | 7/2018 | Wheeler | ............ | G01C 21/3635 |
| 2018/0190122 A1* | 7/2018 | Guarneri | .............. | G06K 9/48 |
| 2019/0266419 A1* | 8/2019 | Schack | .............. | G06T 7/73 |
| 2019/0291726 A1* | 9/2019 | Shalev-Shwartz | .... | B60W 10/20 |
| 2019/0384294 A1* | 12/2019 | Shashua | ............. | G05D 1/0088 |
| 2020/0017102 A1 | 1/2020 | Gassmann et al. | | |
| 2020/0086859 A1* | 3/2020 | McGill, Jr. | .......... | G05D 1/0088 |
| 2020/0108833 A1* | 4/2020 | Sim | ........................ | G01C 21/28 |
| 2020/0180612 A1* | 6/2020 | Finelt | ................... | G05D 1/0246 |
| 2020/0257301 A1* | 8/2020 | Weiser | ................. | G06K 9/00791 |
| 2020/0393265 A1* | 12/2020 | Piao | ......................... | G06T 7/10 |
| 2021/0001877 A1* | 1/2021 | Han | ..................... | G08G 1/0112 |
| 2021/0061304 A1* | 3/2021 | Braunstein | ........... | G08G 1/0112 |
| 2021/0094577 A1* | 4/2021 | Shalev-Shwartz | ........ | G06T 7/20 |
| 2021/0110483 A1* | 4/2021 | Shalev-Shwartz | .......................... | B62D 15/0265 |

OTHER PUBLICATIONS

Bender, P. et al.; "Lanelets: Efficient map representation for autonomous driving"; EEE Intelligent Vehicles Symposium (IV); Jun. 2014; pp. 420-425.

Haklay, M. et al.; "Openstreetmap: User-generated street maps."; IEEE Pervasive Computing; 2008; pp. 12-18; vol.7 No. 4.

Dupuis, M.; et al.; "OpenDRIVE 2010 and Beyond-Status and Future of the de facto Standard for the Description of Road Networks"; Proceedings of the Driving Simulation Conference Europe; Aug. 2010; pp. 231-242.

Shalev-Shwartz, S. et al.; "On a Formal Model of Safe and Scalable Self-driving Cars"; in arXiv:1708.06374; 2017-2018; pp. 1-37.

Gassmann, B. et al.; "Towards Standardization of AV Safety: C++ Library for Responsibility Sensitive", IEEE Intelligent Vehicles Symposium (IV); 9-12. Jun. 2019; pp. 2265-2271; https://ieeexplore.ieee.org/Xplore/desktopReportingPrompt.jsp?tp=&arnumber=8813885&htmlRequest=true.

* cited by examiner

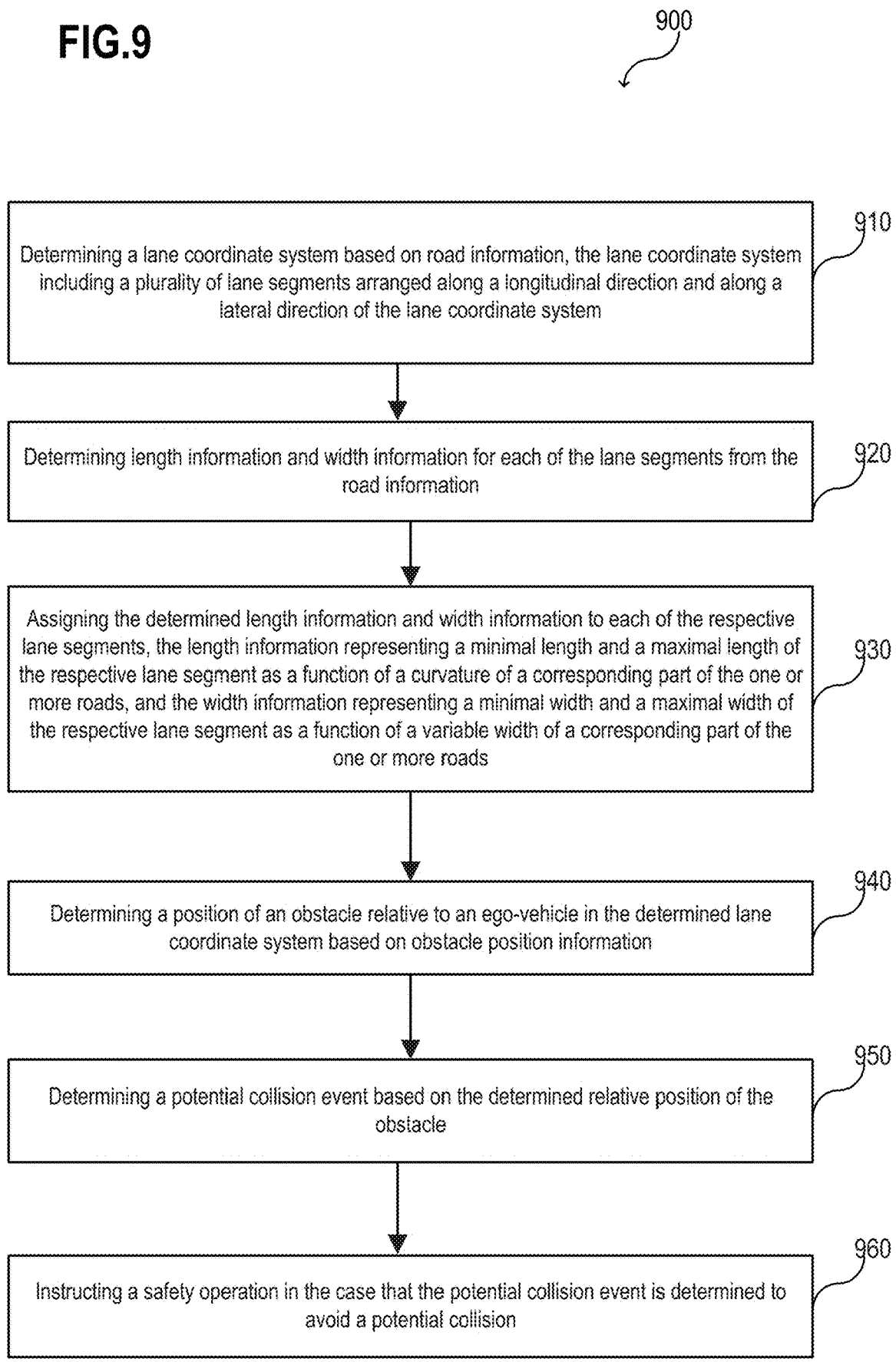

SAFETY MODULE, AUTOMATED DRIVING SYSTEM, AND METHODS THEREOF

TECHNICAL FIELD

Various aspects relate generally to a safety module, an automated driving system, and methods thereof, e.g., a collision avoidance method.

BACKGROUND

In general, modern vehicles may include various active and passive assistance systems to assist during driving of the vehicle. As an example, an automated driving system (ADS) may be implemented in a vehicle. The automated driving system may be also referred to as an autonomous driving system, autopilot, self-driving system, or the like. In many applications, a vehicle that includes an automated driving system may also include one or more sensors and one or more processors that may be configured to control the movement of the vehicle on a predefined trajectory. The one or more sensors and the one or more processors may be configured to predict a collision of the vehicle with an obstacle, e.g., with another vehicle, with a wall, with a pedestrian, etc. Further, one or more autonomous vehicle maneuvering functions may be implemented in a vehicle that includes an automated driving system, e.g., to drive the vehicle into a parking position, to follow another vehicle that is driving ahead, to more or less autonomously drive the vehicle, as examples.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 9 shows a flow diagram of a safety method, according to some aspects.

DESCRIPTION

Figure 1:
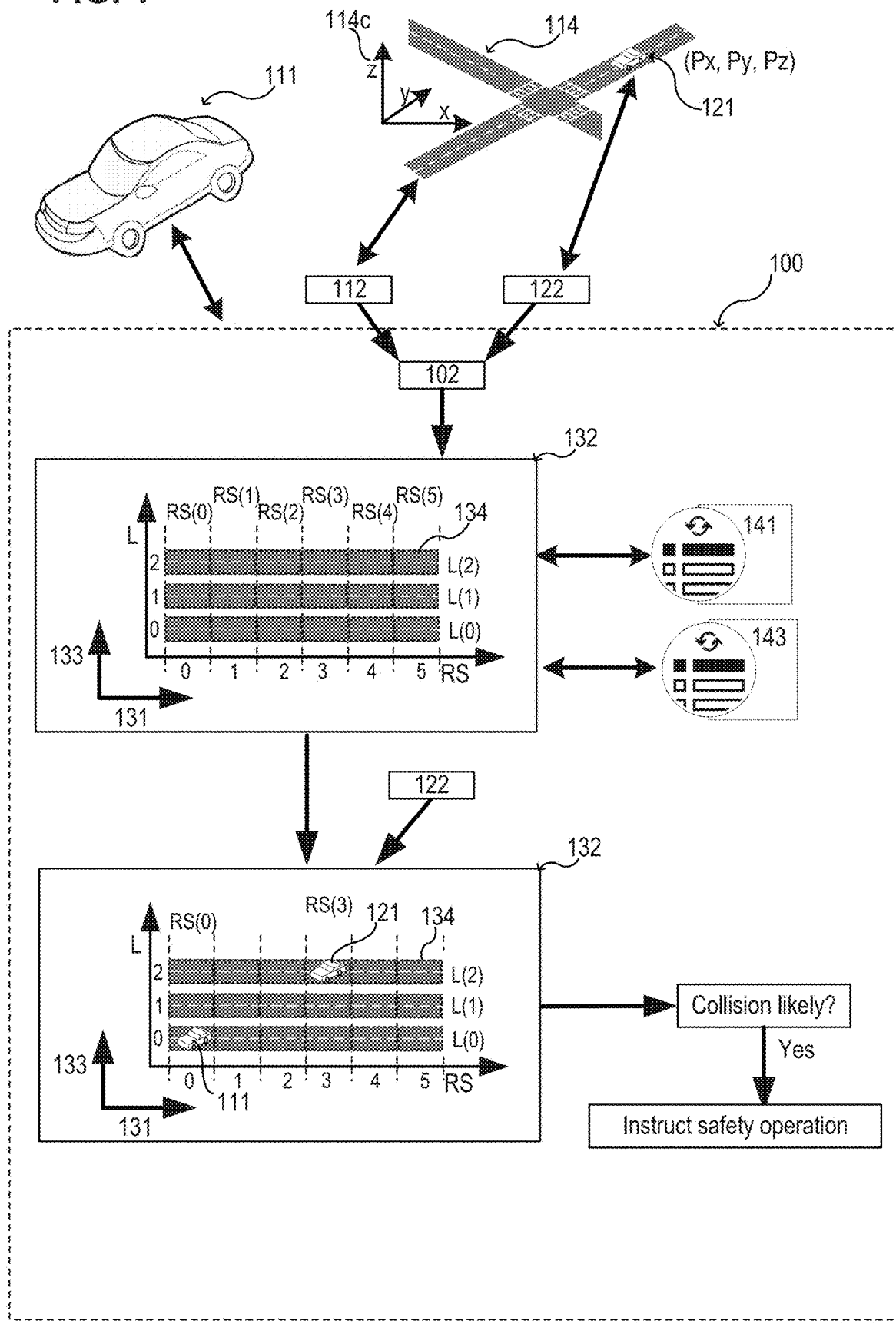
FIG. 1 shows a safety module in a schematic view, according to some aspects.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of (objects)", "multiple (objects)") referring to a quantity of objects expressly refers more than one of the said objects. The terms "group (of)", "set (of)", "collection (of)", "series (of)", "sequence (of)", "grouping (of)", etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The term "processor" as, for example, used herein may be understood as any kind of entity that allows handling data. The data may be handled according to one or more specific functions executed by the processor. Further, a processor as used herein may be understood as any kind of circuit, e.g., any kind of analog or digital circuit. The term "handle" or "handling" as for example used herein referring to data handling, file handling or request handling may be understood as any kind of operation, e.g., an I/O operation, and/or any kind of logic operation. A processor may thus be or include an analog circuit, digital circuit, mixed-signal circuit, logic circuit, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Differences between software and hardware implemented data handling may blur. A processor, controller, and/or circuit detailed herein may be implemented in software, hardware and/or as hybrid implementation including software and hardware.

The term "system" (e.g., a computing system, an automated driving system, a safety system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

As used herein, the term "memory", and the like may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa.

The term "vehicle" as used herein may be understood as any suitable type of vehicle, e.g., any type of ground vehicle, a watercraft, an aircraft, or any other type of vehicle. In some aspects, the vehicle may be a motor vehicle (also referred to as automotive vehicle). As an example, a vehicle may be a car also referred to as a motor car, a passenger car, etc. As another example, a vehicle may be a truck (also referred to as motor truck), a van, etc. As another example, a vehicle may be bicycle or a motorbike. In other aspects, the vehicle may be a partially or fully autonomously flying drone (e.g., an aeronautical taxi) having, for example, a pilot and/or one or more passengers onboard.

The term "lane" with the meaning of a "driving lane" as used herein may be understood as any type of solid infrastructure (or section thereof) on which a vehicle may drive. In a similar way, lanes may be associated with aeronautic traffic, marine traffic, etc., as well. The term "road" with the meaning of a "traffic road" as used herein may be understood as any type of solid infrastructure (or section thereof) on which a vehicle may drive. In a similar way, roads may be associated with aeronautic traffic, marine traffic, etc., as well.

According to various aspects, information (e.g., road information, obstacle position information, etc.) may be handled (e.g., processed, analyzed, stored, etc.) in any suitable form, e.g., data may represent the information and may be handled via a computing system.

A risk that may originate from an obstacle, e.g., a risk for a potential collision, may be treated in an analysis (as described herein) as a potential collision event assigned to the obstacle and a reference vehicle. The reference vehicle may be also referred to as an ego-vehicle. An ego-vehicle may be a vehicle that includes the safety module or that includes the automated driving system including the safety module. In general, an ego-vehicle may be a vehicle that serves as reference in a lane coordinate system. The ego-vehicle or the perspective associated with the ego-vehicle may define, for example, reference driving directions, etc.

In some aspects, one or more sensors may be used for sensing one or more objects that could be one or more obstacles in the vicinity of the one or more sensors to provide, for example, obstacle position information and/or other real world data. A range imaging sensor, for example, may allow range information (or in other words distance information or depth information) to be associated with an image, e.g., to provide a range image having range data associated with pixel data of the image. This allows, for example, for providing a range image of the vicinity of a vehicle including range information about one or more objects depicted in the image. According to various aspects, position data associated with absolute positions of objects or positions of objects relative to a vehicle may be determined from sensor information.

In one or more aspects, a driving operation (such as, for example, any type of safety operation, e.g., a collision avoidance function, a safety distance keeping function, etc.) may be implemented via one or more on-board components of a vehicle, e.g., via an automated driving system. The one or more on-board components of the vehicle may include, for example, a one or more sensors (e.g., one or more cameras, one or more radar sensors, one or more light detection and ranging (LIDAR) sensors, etc.), a computer system, etc., in order to detect obstacles (e.g., at least in front of the vehicle) and to trigger an obstacle avoidance function (e.g., braking, steering, etc.) to avoid a collision with a detected obstacle.

According to various aspects, a computing system may be used to implement one or more functions described herein. The computing system may include, for example, one or more processors and one or more memories, as example. The computing system may be communicatively coupled to one or more sensors (e.g., of a vehicle) to obtain and analyze sensor data generated by the one or more sensors, or the computing system may be coupled to, or may include, a sensor module that obtains and analyzes sensor data generated by one or more sensors.

Several aspects are described herein exemplarily with reference to a motor vehicle, wherein another motor vehicle represents an obstacle in a vicinity of the motor vehicle. However, other types of vehicles may be provided including the same or similar structures and functions as described exemplarily for the motor vehicle. Further, other obstacles may be considered in a similar way as described herein with reference to the other vehicles.

According to various aspects, a safety module may be provided that increases safety during operation of an automated driving system or any other suitable autonomous or partially autonomous system. This may also increase society's trust of automated driving systems. In general, a need for safety assurances in automated driving may become increasingly critical with the accelerating widespread deployment of automated vehicle fleets. Beyond functional safety, it may be desired to guarantee the operational safety of these vehicles. Towards that end, a so-called Responsibility Sensitive Safety (RSS) may be introduced including a model-based approach to safety. Various aspects of the present disclosure may be related to an RSS Open Library, i.e., an open source executable implementation of RSS. In some aspects, the RSS Open Library may be integrated with automated driving software pipelines as a safety module overseeing decision making of driving policies. As an example, the RSS may be integrated with a software platform to provide safety validation.

In general, advanced automated driving systems with capabilities, for example, beyond level 3 (L3+) may require significant investments in operational safety, in particular in the areas of scenario development and formal verification, testing and validation tools. Level 3 may be referred to as a level of driving automation in which a driver can safely turn his attention away from driving tasks, e.g., the driver can send a message via a communications system, watch a movie, or the like, and wherein the vehicle may handle situations that call for an immediate response, like emergency braking. However, in a level 3 driving automation, a driver has to be prepared to intervene within some limited time upon notification. RSS may include a technology neutral model for safety that can be used to define and measure whether an automated vehicle is driving safely. RSS may in some aspects formalize an interpretation of a common sense definition of what it means to drive safely, and may define what it means for an automated vehicle to drive safely on its own and how it should exercise reasonable caution to protect against the unsafe driving behavior of others.

FIG. 1 illustrates a safety module 100 in a schematic view, according to various aspects. The safety module 100 may include one or more processors 102. The one or more processors 102 may be part of a computing system of a vehicle. The safety module 100 and/or the one or more processors 102 of the safety module 100 may be associated with an ego-vehicle 111. The safety module 100 and/or the one or more processors 102 of the safety module 100 may be integrated into or communicatively coupled with an automated driving system of the ego vehicle 111, as an example.

According to various aspects, the one or more processors 102 may be configured to receive road information 112. In some aspects, the road information 112 may be provided to the one or more processors 102 from a sensing module of an automated driving system (as described, for example, in FIG. 8). However, the road information 112 may be provided to the one or more processors 102 with any suitable technique, e.g., the road information 112 may be transmitted wirelessly to a receiver that may be communicatively coupled with the one or more processors 102. The road information 112 may represent a geometry and/or other properties of one or more roads 114. As an example, the road information 112 may include a width of the one or more roads 114 along the course of the respective road, a curvature of the one or more roads 114 along the course of the respective road, or any other geometric property as a function of a position along the respective road. According to various aspects, the road information 112 may represent the geometry of the one or more roads 114 in a Cartesian coordinate system 114c. As an example, the road information 112 may represent a road map in Cartesian coordinates 114c or the road information 112 may be obtained from a road map in Cartesian coordinates 114c.

According to various aspects, the one or more processors 102 may be configured to receive obstacle position information 122 associated with a position of an obstacle 121 on the one or more roads 114. The position of the obstacle 121 may be defined in two-dimensional coordinates (Px, Py) or, where appropriate, in three-dimensional coordinates (Px, Py, Pz). The obstacle 121 may be, according to various aspects, another vehicle driving on the road. However, the obstacle 121 may be a pedestrian, a cyclist, a construction side, or any other static or movable obstacle that is relevant for safety aspects in traffic.

According to various aspects, the one or more processors 102 may be configured to determine a lane coordinate system 132 based on the received road information 112. The lane coordinate system 132 may include a plurality of lane segments 134. In the lane coordinate system 132, one or more first sets of lane segments may represent one or more lanes L(0), L(1), L(2) of the respective road. Each of the one or more lanes L(0), L(1), L(2) may include lane segments 134 arranged along a first (e.g., longitudinal) direction 131. Further, in the lane coordinate system 132, second sets of lane segments 134 may represent road segments RS(0), RS(1), RS(2), RS(3), RS(4), RS(5) of the respective road. Each of the road segments RS(0), RS(1), RS(2), RS(3), RS(4), RS(5) may include lane segments 134 arranged along a second (e.g., lateral) direction 131. It is noted, that exemplarily a road with three lanes L and six road segments RS is illustrated in FIG. 1; however, a road may include more or less than three lanes L and more or less than six road segments RS.

As an example, the road illustrated in the lane coordinate system 132 in FIG. 1 may include three times six lane segments 134. Each lane segment 134 may be identified by the number of a corresponding road segment RS and a number of a corresponding lane L as a tuple (RS, L). As example, a first lane segment (0, 0) may correspond to road segment 0 and lane 0, a second lane segment (1, 0) may correspond to road segment 1 and lane 0, [ . . . ], a seventh lane segment (0, 1) may correspond to road segment 0 and lane 1, an eighth lane segment (1, 1) may correspond to road segment 1 and lane 1, [ . . . ], etc. According to various aspects, a length information 141 and a width information 143 may be assigned to each of the lane segments 134. The length information 141 may represent at least a minimal length and a maximal length of the respective lane segment 134. This minimal length and maximal length may be a function of a curvature of a corresponding part of the respective road, as exemplarily illustrated in more detail in FIG. 2A. The width information 143 may represent at least a minimal width and a maximal width of the respective lane segment 134. This minimal width and maximal width may be a function of a variable width of a corresponding part of the respective more road, as exemplarily illustrated in more detail in FIG. 2B and FIG. 2C.

In a similar way, a height information (not illustrated) may be assigned to each of the lane segments 134. The height information may represent at least a minimal height and a maximal height of the respective lane segment 134. This minimal height and maximal height may be a function of a three-dimensional geometry of a corresponding part of the respective road, for example, in the case that three-dimensional coordinates are to be considered for the roads.

According to various aspects, the one or more processors 102 of the safety module 100 may be further configured to determine a position of the obstacle 121 relative to the ego-vehicle 111 in the lane coordinate system 132 based on the obstacle position information 122. As exemplarily illustrated in FIG. 1, the ego-vehicle 111 may have a position in the lane segment (0, 0) and the obstacle 121 (e.g., another vehicle participating in traffic) may have a position in the lane segment (3, 2).

According to various aspects, the one or more processors 102 may be configured to determine a potential collision event (e.g., a likelihood for a collision of the ego-vehicle 111 with the obstacle 122) based on the determined relative position of the obstacle 121. In the case that the potential collision event is determined (e.g., if a determined likelihood for a collision is at or above a predefined threshold), the one or more processors 102 may be configured to instruct one or more safety operations to avoid a potential collision.

In the following, reference is made to FIGS. 2A to 2C that illustrate one or more aspects that may be considered during a transformation of road information from a description in Cartesian coordinates into lane coordinates. However, similar aspects may apply for a transformation of road information from a description in polar or other at least partially metric coordinates into lane coordinates.

In some aspects, automated driving vehicles may use road and lane markings to identify driving corridors (also referred to as lanes). Perception and localization of these lane boundaries, as well as of dynamic and static obstacles in the environment may constitute a basis of a driving situation coordinate system. Automated driving vehicles may use road or lane-based coordinate systems to derive lateral and longitudinal safety distance calculations for planning their path and avoid driving infractions and collisions. General approaches to road/lane-based coordinate systems in automated driving may include assumptions, considering driving corridors to follow certain rules (e.g., lane markings are parallel, follow constant curvature or keep constant width). However, real world conditions may be more complex and may often break such ideal assumptions. Roads may have, for example, a changing curvature to adapt to irregular terrain, lanes may have, for example, changing widths (e.g., in construction sites or at merging lanes areas). In some cases, a deterioration on road markings might confuse perception systems.

According to various aspects, the safety module 100 described herein may use a lane coordinate system 132 to abstract from changing road geometries in the calculations of vehicle constellations, safe distances, and proper response to situations getting dangerous. According to various aspects, a bijective embedding of a lane coordinate system may be used to describe general road geometries for every situation. Various aspects described herein may be related to an actual transformation of the observed real world situation between two vehicles (e.g., an ego-vehicle and another vehicle) into a concrete lane based coordinate system to be able to apply one or more safety calculations defined by, for example, RSS. Ignoring, for example, deviations of a real world situation from an ideal model description might lead to inconsistencies and wrong safety estimations in real world conditions.

Figure 3:
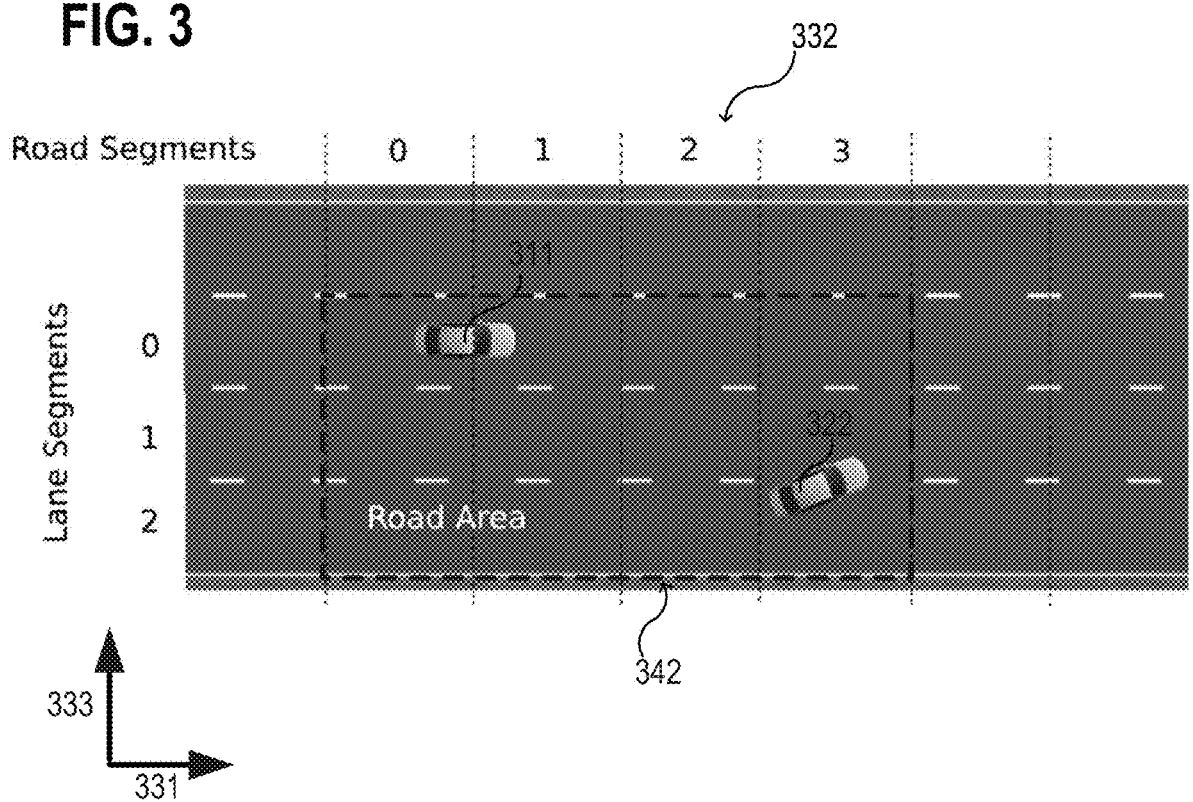
FIG. 3 shows a determination of a road area of interest in a lane coordinate system in a schematic view, according to some aspects.
Figure 6:
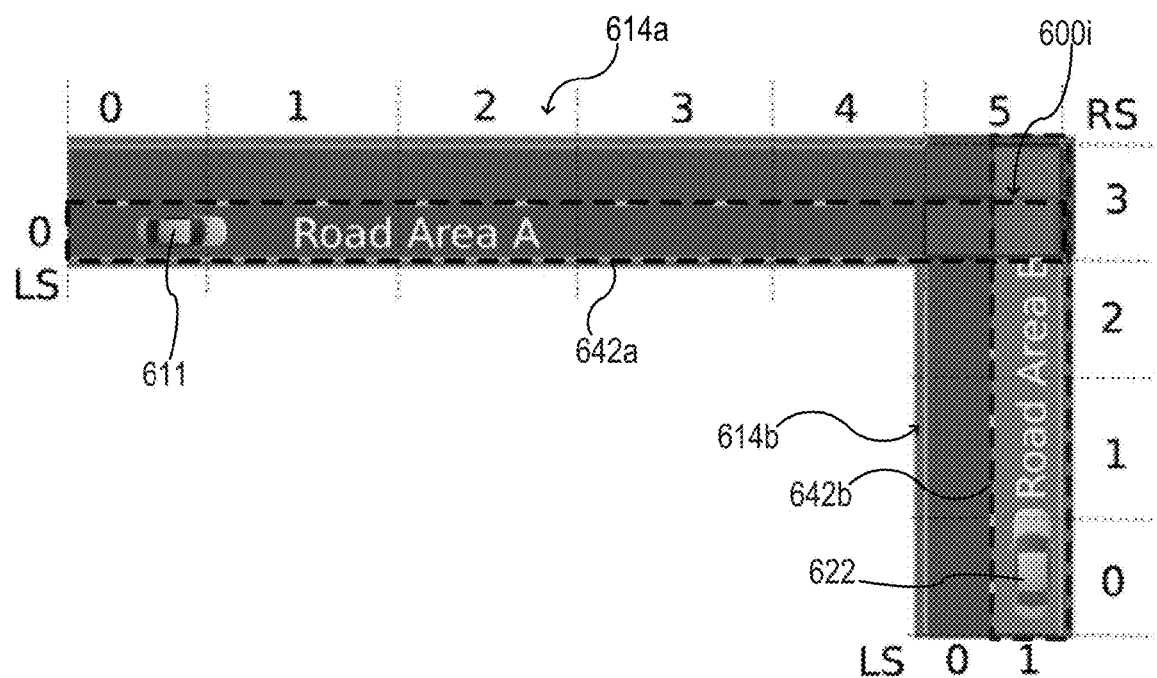
FIG. 6 shows a determination of road areas of interest associated with two vehicles in an intersection situation in a lane coordinate system in a schematic view, according to some aspects.
Figure 7:
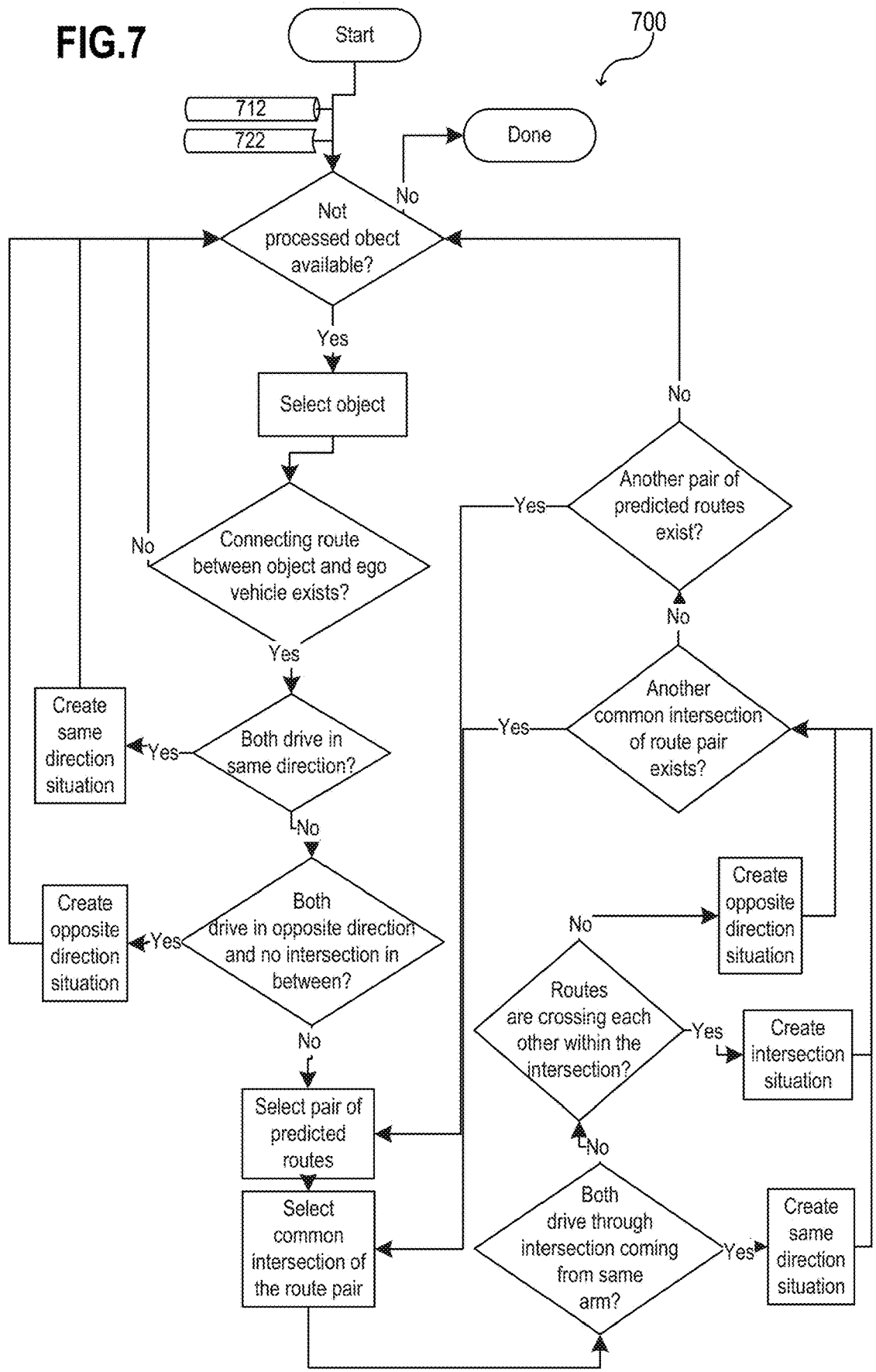
FIG. 7 shows a flow diagram of a determination of one or more situations associated with a situation-based lane coordinate system, according to some aspects.

According to various aspects, a situation-based coordinate system may be constructed that may include transformations from a Cartesian road definition, for example, from a high definition map, into a situation-specific lane coordinate system that may describe a constellation of one or more pair-wise situations between two vehicles (see, for example, FIG. 3, FIG. 6, and FIG. 7). This situation-based lane coordinate system may be used to translate real-world road geometries into a conditional framework as, for example, required by RSS to perform accurate safety guarantee calculations, thus abstracting real-world complexity from the clean, formally proven, safety calculations of RSS and expanding the usefulness of RSS into more real-world conditions.

One of the commonly used approaches for mapping information for maneuver planning may be through the use of lanelets, which describe small or irreducibly small lane segments characterized by its left and right bounds. Lanelets may allow for composing of complex road situations and incorporating tactical information for maneuver generation such as rule-compliant intersections. Another mapping approach may be, for example, via Open Street Map, a crowdsourced database promulgated by the OpenStreetMap Foundation, which provides free, geographic street maps. Open Street Map models the world with nodes, ways, and relations and is useful to represent topological information. Another map representation may be OpenDrive (also written as OpenDRIVE), which is managed by VIRES Simulationstechnologie GmbH and the OpenDRIVE community. OpenDrive is an open format specification to describe a road network's logic, and thus may provide a standardized road network file format. It may be useful to provide a common interface between driving simulators at a macroscopic (e.g., road topology) level. The current techniques may be successful at solving particular mapping problems and may provide a basis for high definition maps. However, they may focus on static road elements and may not describe dynamic objects. Both may be useful for a situation-based coordinate system in RSS. According to various aspects, the safety module 100 described herein may support current techniques and may provide a bridge between a mapping tool and a safety tool (e.g., RSS).

According to various aspects, any given road shape may be converted by the safety module 100 into a (e.g., simplified) situation-based coordinate system where, for example, lanes are straight and have the same width, while maintaining worst-case assumptions of the distances between the vehicles. Such a coordinate system may be used by RSS to determine lateral and longitudinal safe distances to vehicles and obstacles on the road. By assigning width intervals and length intervals (or at least a minimum and a maximum for the width and the length) to the lane segments, an effective mapping from real world road geometries to a simplified coordinate environment may be possible on which formal methods can be applied to derive safe behaviors. Such a conversion may be used, for example, to carry out an RSS implementation under real-world road geometries, but can be valuable for all other applications that need to calculate safety distances between objects on a given road.

According to various aspects, it may be of advantage to switch from a Cartesian space into a road/lane-based coordinate system for calculating (e.g., safety) distances between vehicles. According to various aspects, a situation-based coordinate system may be used, which may be understood as a specific lane-based coordinate system generated for the respective traffic situation. However, when transforming the Cartesian space into such a lane-based coordinate system, several challenges have to be taken into consideration, as explained in the following in more detail.

Figure 2A:
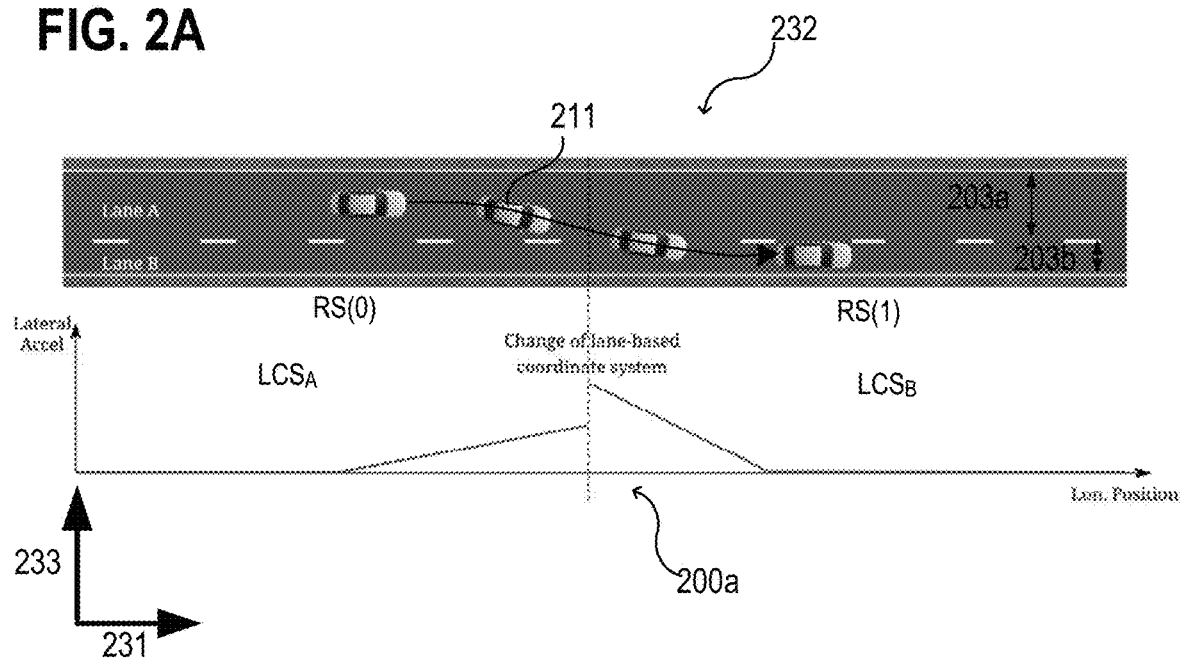
FIGS. 2A to 2C show various aspects of a transformation of a Cartesian description of one or more roads to a lane-based description of the one or more roads.

FIG. 2A illustrates a discontinuity problem that may occur in a lane coordinate system 232 having a fixed value for the width 203a, 203b assigned to the respective lanes (see Lane A and Lane B). The discontinuity problem may arise in that case that movements are compared in such a lane-based coordinate system 232, as illustrated exemplarily in the diagram 200a in FIG. 2A. The diagram 200a shows the lateral acceleration (depicted on the vertical axis parallel to a lateral direction 233 associated with the lane coordinate system 232) as a function of the longitudinal position of the vehicle 211 (depicted on the horizontal axis parallel to a longitudinal direction 231 associated with the lane coordinate system 232).

During a transformation from a Cartesian coordinate system into a lane-based coordinate system, not only the position but also the velocities and accelerations of a vehicle may be transformed. The resulting values may therefore depend on the actual lane geometry, and thus, velocities and accelerations of different lane-based coordinate systems may not be comparable to each other anymore in some cases. As an example, FIG. 2A shows two lanes (Lane A and Lane B) that are parallel to one another but have widths 203a, 203b that are different from one another, for example, a first lane (Lane A) may be wider than a second lane (Lane B). In the case that the vehicle changes its position from the first lane in road section RS(0) to a second lane in the next road section RS(1), a discontinuity in the lateral acceleration may be determined due to the different widths 203a, 203b of the lanes.

Only as a numerical example, the first lane (Lane A) may have a constant width of 4 m and the second lane (Lane B) may have a constant width of 2 m. If both lanes define their own lane coordinate system $LCS_A$ and $LCS_B$, a Cartesian lateral acceleration value of 1 m/s$^2$ becomes 0.25 lat/s$^2$ in $LCS_A$ and 0.5 lat/s$^2$ in $LCS_B$. This situation may get even worse, if a vehicle changes the lane from a first lane (Lane A) to a second lane (Lane B). In this case, a closed formula for a constant accelerated movement to calculate a lateral distance over time cannot be applied anymore directly due to a discontinuity, as illustrated in FIG. 2A.

Figure 2B:
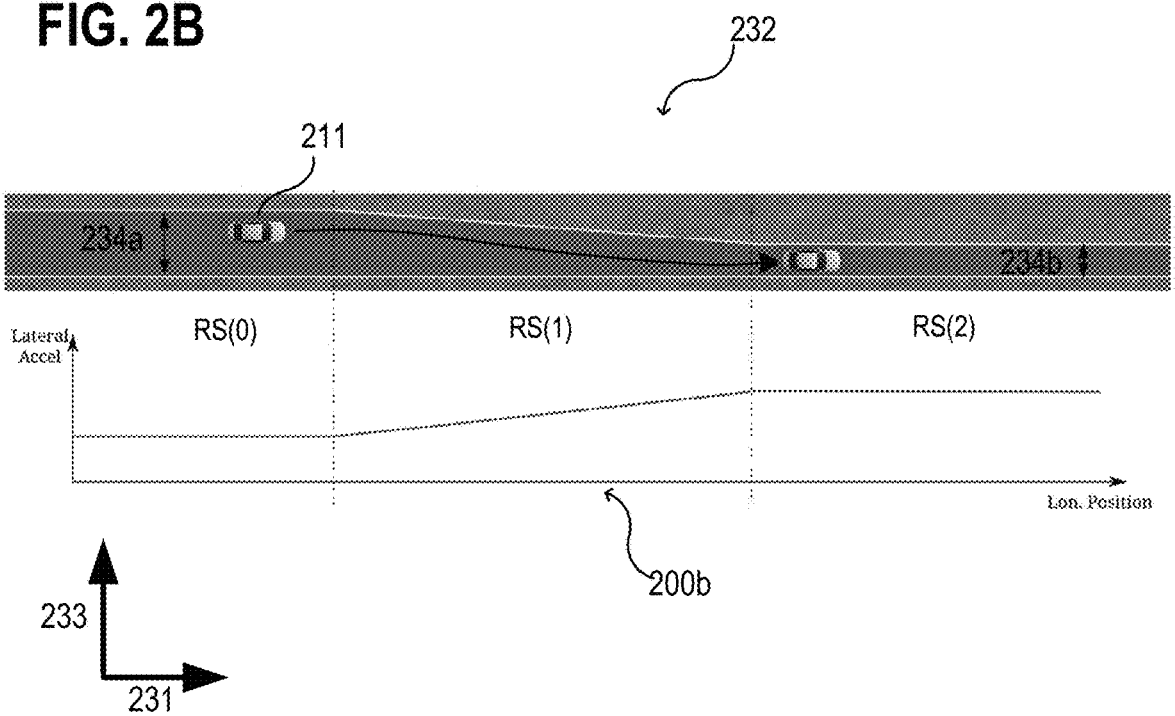

FIG. 2B illustrates a changing of a lateral acceleration that may occur in a lane coordinate system 232 having a variable width assigned to at least one lane 234. The diagram 200b in FIG. 2B shows the lateral acceleration (depicted on the vertical axis parallel to a lateral direction 233 associated with the lane coordinate system 232) as a function of the longitudinal position of the vehicle 211 (depicted on the horizontal axis parallel to a longitudinal direction 231 associated with the lane coordinate system 232). Illustratively, a changing lane width (e.g., a lane widening and/or a lane narrowing) may have an impact on the lateral acceleration associated with a vehicle 211. As a numerical example, it may be assumed that a width of the lane 234 may be, for example, 4 m (e.g., in a first road segment RS(0) with a first width 234a) and 100 m farther away the lane 234 may be narrowing to, for example, 2 m (e.g., in a second road segment RS(2) with a second width 234b). In such a case, the Cartesian lateral acceleration value of 1 m/s$^2$ may be changing from 0.25 lat/s$^2$ (in the first road segment RS(0)) towards 0.5 lat/s$^2$ (in the second road segment RS(2)) while advancing within the lane 234.

Figure 2C:
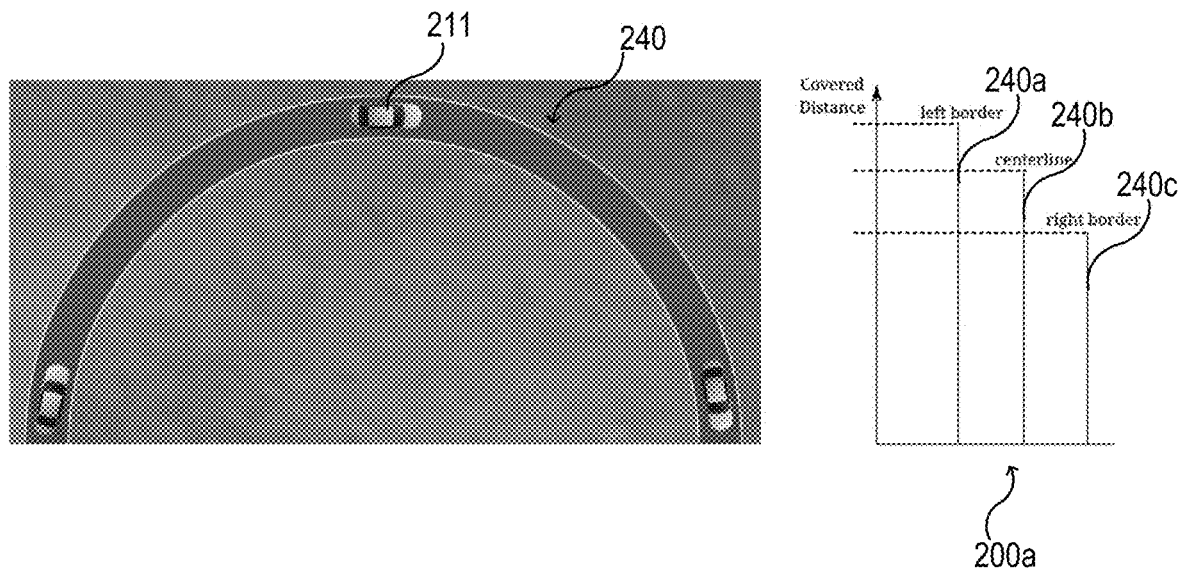

FIG. 2C illustrates a curve 240 and its impact on driving distances associated therewith. The diagram 200c in FIG. 2C shows a covered distance (depicted on the vertical axis parallel) associated with a movement of a vehicle 211 through the curve 240 as a function of the trajectory 240a, 240b, 240c on which the vehicle 211 is moving, e.g., at the left border 240a, at the centerline 240b, or at the right border 240c.

Illustratively, this may be a longitudinal situation similar to the lane-widening/narrowing example. Only as an example, the lane may have a constant width of 4 m, may describe a curve with inner radius of 50 m, and may cover 180°. The inner border of the lane may have—in this example—a length of about 157.1 m, the centerline 163.4 m, and the outer border 169.7 m. In this situation, a longitudinal acceleration value will evaluate to 1.0 lon/s$^2$ for the centerline 240b, 0.96 lon/s$^2$ for the outer border 240a, and 1.04 lon/s$^2$ for the inner border 240c. Therefore, in a corresponding lane coordinate system, the longitudinal acceleration may change over time in the case that the vehicle changes its lateral position within the lane if that this issue would not be addressed accordingly.

As described above with reference to FIGS. 2A to 2C, both the longitudinal acceleration values and the lateral acceleration values as well as the longitudinal velocities and the lateral velocities within a lane coordinate system 232 may be problematic if they are considered constant or described only with a single value. According to various aspects it was found that these values do not only change within one coordinate system, but also when changing from one lane-based system to another one lane-based system. To overcome this issue, a situation-based lane coordinate system is provided that is described in more detail below. Such a lane coordinate system may be generated for one or more constellations between two vehicles (also referred to as situations) and may include all lane segments (but only such lane segments) that are required or are useful to describe the respective situation properly.

According to various aspects, it was found that the longitudinal position of a vehicle may be no longer unambiguously defined, when a road curve is transformed from a Cartesian system into a lane coordinate system. As illustrated, for example, in FIG. 2C, the longitudinal position may be a function of the lateral position of the vehicle 211. To overcome this ambiguity, the longitudinal position may be described in the situation-based lane coordinate system by a [min, max] interval (or at least by a minimal and a maximal value), which is given by the minimal and maximal possible longitudinal position. The same applies to the lateral position, when lane widths are changing. Consequently, the lateral position is transformed, according to various aspects, from a position in the Cartesian space into a [min, max] interval (or at least by a minimal and a maximal value) in the situation-based lane coordinate system.

As a result, according to various aspects, each point (x, y) in the Cartesian space (e.g., in a two-dimensional Cartesian space such as used, for example, in high definition (HD) maps) may be described by two intervals [$x_{min}$, $x_{max}$] and [$y_{min}$, $y_{max}$] or at least by four values ($x_{min}$, $x_{max}$, $y_{min}$, $y_{max}$). According to various aspects, this resolves, for example, all of the aforementioned problems of lane-based coordinate systems (e.g., discontinuities etc.). In a similar way, each point (x, y, z) in the Cartesian space (e.g., in a three-dimensional Cartesian space such as used, for example, in maps for aircrafts and flying drones) may be described by three intervals [$x_{min}$, $x_{max}$], [$y_{min}$, $y_{max}$], and [$z_{min}$, $z_{max}$] or at least by six values ($x_{min}$, $x_{max}$, $y_{min}$, $y_{max}$, $z_{min}$, $z_{max}$). According to various aspects, this resolves, for example, all of the aforementioned problems of transformations into a lane coordinate system (e.g., discontinuities, etc.).

As a result, one or more of the following aspects may be realized:

The velocity and the acceleration values in longitudinal and lateral lane directions do not change when transforming into the situation-based coordinate system.

The formulas used for constant accelerated movement may be applied in the situation-based coordinate space accordingly.

Distance calculations in the situation-based coordinate systems may include or may consist of simple additions or subtractions.

The transformation of a position of a vehicle into a situation-based lane coordinate system may be simple and therefore may be implemented, for example, easily with the restricted computational resources of one or more safety controllers or one or more other processors included in the ego-vehicle.

In the following, a construction of one or more road areas relevant for a specific situation is described in more detail; as described, for example, FIG. 3, FIG. 4, FIG. 6, and FIG. 7. A road area that may be relevant for a situation may be also referred to herein as area of interest or as road area of interest. It is noted that embodiments of the present invention described herein may be realized by different implementations. In the following, one exemplary way is described how this may be realized when having basic road geometry data available. According to various aspects, the road geometry data may not be necessarily provided via an HD—(high definition)—map; as an example, the road geometry data may be computed on the fly. In the following, we consider the road information (e.g., road geometry data) as a road network input.

According to various aspects, an incorporation of changes in the road geometries into a worst-case consideration of positions and distances—as exemplarily described herein—makes a vehicle behave over-cautiously in the case that road sections would be taken into account that are unnecessarily large. As an example, the more the differences in minimal/maximal width or minimal/maximal length of the used lane segments are, the more conservative the behavior of the vehicle will be. Therefore, it may be helpful in some aspects to restrict the road area for the creation of the situation to the direct surrounding of two vehicles that are considered. Illustratively, this may be similar to a creation of a bounding box around the two vehicles that is large enough to cover the RSS relevant vehicle positions, while ignoring actual lane markings on the road (see FIG. 3).

FIG. 3 shows a situation including two vehicles 311, 322 in a lane coordinate system 332, according to various aspects. A bounding box 342 may be created to include all lane segments that cover, for example, RSS relevant vehicle positions. As an example, the bounding box 342 may be the road area of interest including all lane segments in which the two vehicles 311, 322 are positioned and, additionally, all lane segments between the two vehicles 311, 322 both in longitudinal direction 331 and in lateral direction 333. Since the situation-based lane coordinate system 332 may abstract from the actual lane geometry, it may be sufficient to describe the lane segments by their extrema: minimum/maximum length and minimum/maximum width. Nevertheless, the nominal driving direction of the lane segments in respect to the direction of the road area may be preserved to allow, for example, RSS to decide if a vehicle is driving in wrong direction. The direction of the road area 342 may be defined by the driving direction of the two vehicles 311, 322. In an opposite direction use-case, where both vehicles 311, 322 are approaching each other, the direction of the road area 342 may be defined by the driving direction of the ego-vehicle.

Figure 4:
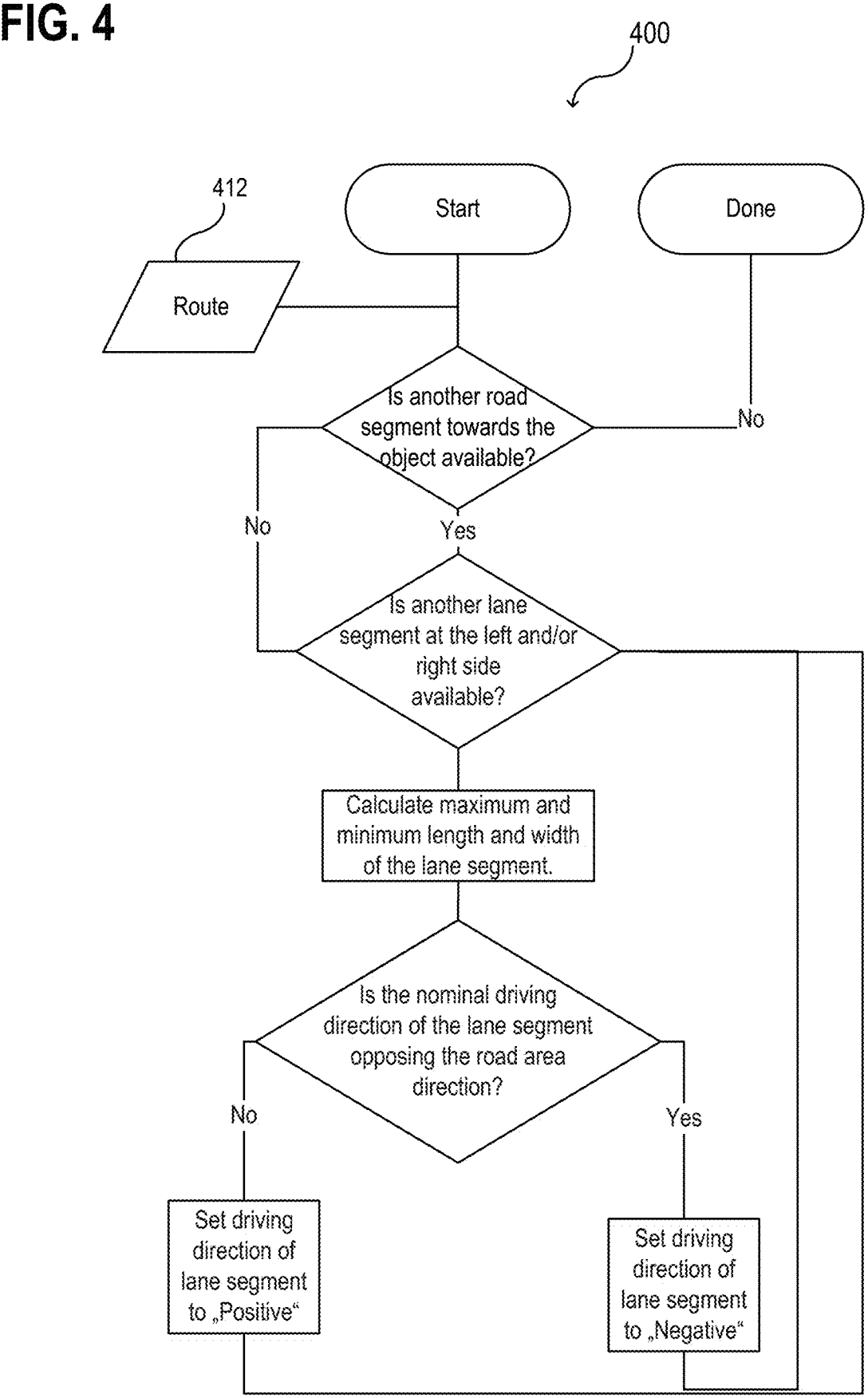
FIG. 4 shows a flow diagram of a determination of a road area of interest in a lane coordinate system, according to some aspects.

FIG. 4 shows an exemplary flow diagram of a method 400 for a construction of a situation specific road area 342 (also referred to herein as a road area, area of interest, or bounding box) as basis for the situation-based lane coordinate system from road information (e.g., input route data) 412. The situation specific road area may be determined in the lane coordinate system and may include a set of lane segments assigned thereto, wherein the ego-vehicle (e.g., vehicle 311 and the obstacle 322 illustrated in FIG. 3) are positioned therein. The determination of the situation specific road area may include determining each lane segment between the ego-vehicle and the obstacle in longitudinal direction and in lateral direction.

According to various aspects, a bounding box (e.g., a parametric bounding box) may be determined for each of one or more lane segments of the situation specific road area, the bounding box may represent a space occupied by the ego-vehicle, an obstacle, etc.

As exemplarily illustrated in FIG. 3, the situation specific road area 342 may include an origin road segment (e.g., road segment 0). The origin road segment may include one or more lane segments (e.g., lane segments (0, 0), (1, 1), (0, 2)) arranged along the lateral direction 333, wherein a vehicle 311 (e.g., the ego-vehicle) may be positioned in at least one of the one or more lane segments assigned to the origin road segment. Further, the situation specific road area 342 may include a maximal road segment, RS(max), (e.g., road segment 3 in the example shown in FIG. 3) that may include one or more lane segments (e.g., lane segments (3, 0), (3, 1), (3, 2)) arranged along the lateral direction 333, wherein the obstacle (e.g., vehicle 322) may be positioned in at least one of the one or more lane segments assigned to the maximal road segment.

As exemplarily illustrated in FIG. 3, the situation specific road area 342 may include an origin lane (e.g., lane 0) including one or more lane segments (e.g., four lane segments, one in each of the four road segments 0 to 3) arranged along the longitudinal direction 331, wherein a vehicle (e.g., the ego-vehicle 311) may be positioned in at least one of the one or more lane segments assigned to the origin lane. Further, the situation specific road area 342 may include a maximal lane, L(max), (e.g., lane 2 in the example shown in FIG. 3) including one or more lane segments arranged along the longitudinal direction 331, wherein the obstacle (e.g., vehicle 322) may be positioned in at least one of the one or more lane segments assigned to the maximal lane.

According to various aspects, the ego-vehicle 311 may be positioned at least partially in the lane segment (0, 0) and the obstacle (e.g., vehicle 322) may be positioned at least partially in the lane segment (RS(max), L (max)), for example, in lane segment (3,2) in the example shown in FIG. 3.

According to various aspects, one or more processors may be configured to determine at least a minimal length and a maximal length and/or a minimal width and a maximal width of the situation specific road area.

In the following, a construction of a situation-based bounding box within the road area is described exemplarily in more detail, according to various aspects. Based on the situation specific road area, an individual bounding box of the vehicles/obstacles may be determined, according to various aspects. Since, for example, RSS may perform a worst-case assessment, the idea followed by the situation-based lane coordinate system may be to incorporate the variation of lane segment widths and lengths within the situation specific road area by considering the extremes, while transforming the vehicles bounding boxes into the situation-based lane coordinate system. According to the constellation of the vehicles within the situation, the respective worst-case lateral and longitudinal border values may be selected, in order to calculate the distances between the vehicles, which may be finally processed by the RSS formulas, as example. The performed operations may be interpreted as enlarging the vehicles bounding boxes within the situation-based coordinate system to ensure, for example, that the worst-case may be covered (see, for example, FIG. 5).

Figure 5:
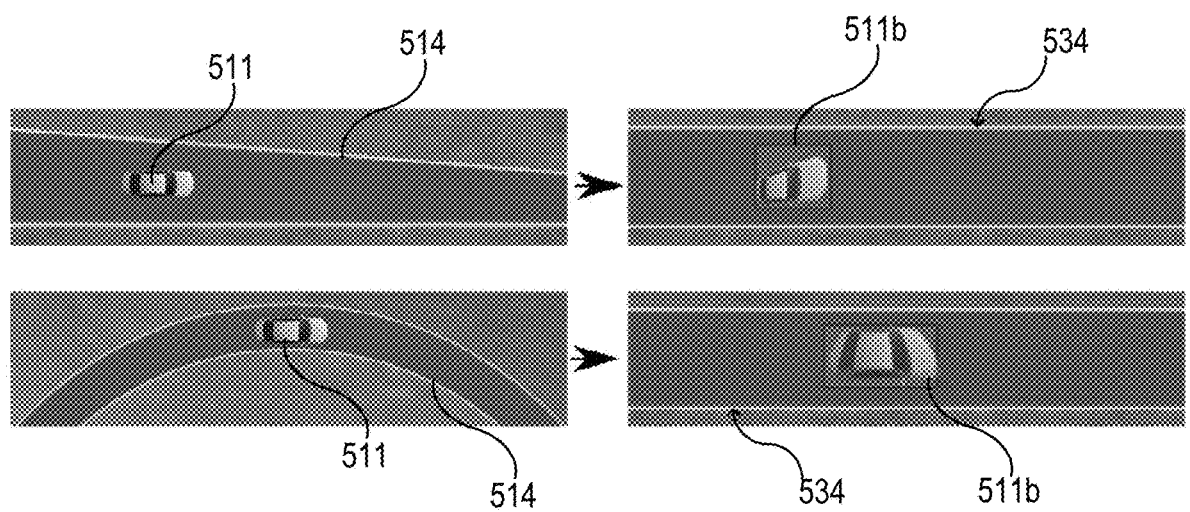
FIG. 5 shows a determination of a bounding box associated with a vehicle in a lane coordinate system in a schematic view, according to some aspects.

FIG. 5 shows a worst-case transformation of a bounding box 511b associated with a vehicle 511, according to various aspects. The metric road 514 may lead (due to the geometry, such as the lane narrowing and/or the curvature) to transformed vehicles represented by their bounding boxes 511b.

As an example for a potential implementation, the bounding box 511b of the vehicle 511 may be described as a list of parametric bounding boxes (PBB) within every lane segment of the road area (parametric value $\in [0.0; 1.0]$). For a calculation of the velocity within the situation, for example, the center of this bounding box and the vehicle orientation may be considered as a basis to split the vehicle speed into its lateral and longitudinal components in respect to the lane segment 534. The overall minima/maxima of the road segment 534 at index r ($RS_{min}^r$, $RS_{max}^r$) may be, for example, calculated by combination of the minima/maxima ($LS_{min}$, $LS_{max}$) of the contained lane segments based on the following equations:

$$RS_{lon,min}^r = \min_l(LS_{lon,min}^{r,l}) \quad \text{(Equation 1)}$$

$$RS_{lon,max}^r = \max_l(LS_{lon,max}^{r,l}) \quad \text{(Equation 2)}$$

$$RS_{lat,min}^r = 0 \quad \text{(Equation 3)}$$

$$RS_{lat,max}^r = \sum_l LS_{lat,max}^{r,l} \quad \text{(Equation 4)}$$

The overall minima/maxima dimensions of the road area ($RA_{min}$, $RA_{max}$) may be, for example, calculated by the combinations of the minima/maxima of the road segments based on the following equations:

$$RA_{lon,min} = \sum_r RS_{lon,min}^r \quad \text{(Equation 5)}$$

$$RA_{lon,max} = \sum_r RS_{lon,max}^r \quad \text{(Equation 6)}$$

$$RA_{lat,min} = \min_r(RS_{lat,min}^r) = 0 \quad \text{(Equation 7)}$$

$$RA_{lat,max} = \max_r(RS_{lat,max}^r) \quad \text{(Equation 8)}$$

In a similar manner, the parametric bounding box definitions may be used to calculate the minimal and maximal metric position in longitudinal direction of the vehicle within the whole road area: the minimal longitudinal position of a vehicle ($BB_{min}^{lon}$) is e.g., calculated by taking the sum of all minimal metric lengths of all previous road segments, plus the parametric scaled minimal length of the first road segment it touches.

The calculation may be based on the following equations, wherein i may be the first road segment the vehicle touches:

$$BB_{lon,min} = \sum_{r=0}^{i-1} RS_{lon,min}^r + \min_l(PBB_{lon,min}^{i,l} * LS_{lon,min}^{i,l}) \quad \text{(Equation 9)}$$

The calculation may be based on the following equations, wherein i may be the last road segment the vehicle touches:

$$BB_{lon,max} = \sum_{r=0}^{i-1} RS_{lon,max}^r + \max_l(PBB_{lon,max}^{i,l} * LS_{lon,max}^{i,l}) \quad \text{(Equation 10)}$$

The calculation may be based on the following equations, wherein i may be the first lane segment within road segment r the vehicle touches:

$$BB_{lat,min} = \min_r\left(\sum_{l=0}^{i-1} LS_{lat,min}^{r,l} + (PBB_{lat,min}^{r,i} * LS_{lat,min}^{r,i})\right) \quad \text{(Equation 11)}$$

The calculation may be based on the following equations, wherein i may be the last lane segment within road segment r the vehicle touches:

$$BB_{lat,max} = \max_r\left(\sum_{l=0}^{i-1} LS_{lat,max}^{r,l} + (PBB_{lat,max}^{r,i} * LS_{lat,max}^{r,i})\right) \quad \text{(Equation 12)}$$

Having the vehicles metric bounding boxes within the road area determined, the current longitudinal and lateral distances of the vehicles towards each other may be calculated. As an example, "A" may index the vehicle 311 in FIG. 3 and "B" may index the vehicle 322 in FIG. 3, the distances between the two vehicles 311, 322 may be defined as follows:

$$d_{lon} = BB_{lon,min}^B - BB_{lon,max}^A \quad \text{(Equation 13)}$$

$$d_{lat} = BB_{lat,min}^B - BB_{lat,max}^A \quad \text{(Equation 14)}$$

According to various aspects, an intersection may be taken into account in the situation between two vehicles or between a vehicle and an obstacle, as explained in more detail below. Taking intersections into account, the description of a situation may demand from each vehicle the (e.g., minimal) distance to enter the intersection and the (e.g., maximal) distance to leave the intersection. Because both vehicles may approach from different roads in this case, two road areas may be taken into account, which end in an overlapping area at the intersection.

FIG. 6 shows an intersection situation with a first vehicle 611 and a second vehicle 622 approaching from different roads 614a, 614b, wherein the roads 614a, 614b overlap each other. In this case, the two road areas 642a, 642b that are created may end in an overlapping area 600i at the intersection. Apart from that, the construction of these two road areas 642a, 642b may follow the same or similar rules as described above. The first road area 642a (Road Area A) may include or may consist of all lane segments along the first road 614a relevant for the first vehicle 611. The second road area 642b (Road Area B) may include or may consist of all lane segments along the second road 614b relevant for the second vehicle 622. The overlapping area 600i may include intersecting lane segments defining the extension of the intersection from the vehicle perspective.

The calculation of the intersection distance of a vehicle may be performed based on the following equation, wherein i may be the first road segment within the intersection:

$$d_{enter} = \Sigma_{r=0}^{i-1} RS_{lon,min}^r - BB_{lon,max} \quad \text{(Equation 15)}$$

The calculation of the intersection distance of a vehicle may be performed based on the following equation, wherein i may be the last road segment within the intersection:

$$d_{exit} = \Sigma_{r=0}^{i} RS_{lon,max}^{r} - BB_{lon,min} \quad \text{(Equation 16)}$$

Having the vehicles metric bounding boxes and the distances to the intersection determined, the current longitudinal distance, $d_{lon}$, of the vehicles 611, 622 towards each other in respect to the intersection may be calculated. As an example, "A" may index the vehicle 611 in FIG. 6 and "B" may index the vehicle 622 in FIG. 6, the distances between the two vehicles 611, 622 with $d_{enter}^{A} > d_{enter}^{B}$, may be calculated based on the following equation:

$$d_{lon} = \max(0, d_{enter}^{A} - d_{enter}^{B} - (BB_{lon,max}^{B} - BB_{lon,min}^{B})) \quad \text{(Equation 17)}$$

According to various aspects, one or more individual situations may be constructed for determining a potential collision event or a collision risk via a safety module, e.g., via the safety module 100 as described with reference to FIG. 1. If the road network becomes more complex than just one straight road, the situation between two vehicles may not be necessarily unambiguous, especially as the vehicles could take different routes through intersections. To guarantee safety, a worst-case may be considered and therefore all potential configurations have to be considered when performing the situation analysis and creating the respective situation based coordinate system. Therefore, according to various aspects, multiple situations may be considered between two vehicles at the same time. Before the road area may be determined, as described herein, the type of situation may be determined, as described, for example, in more detail below.

FIG. 7 shows a flow diagram of a method 700 to create one or more situations that may be used for safety calculations, according to various aspects. According to various aspects, road information 712 (also referred to as road network data) as well as obstacle position information 722 (also referred to as object data) may be available as input.

According to various aspects, presence of at least one of the following situations may be determined, e.g., by the one or more processors 102 of the safety module 100: a same direction situation representing the ego-vehicle and the vehicle are driving in the same direction with respect to a connecting route, an opposite direction situation representing the ego-vehicle and the vehicle are driving in opposite directions with respect to a connecting route and no intersection is in between the ego-vehicle and the vehicle, and/or an intersection situation representing the ego-vehicle and the vehicle are driving in the same direction or in opposite directions with respect to one or more connecting routes and one or more intersections are in between the ego-vehicle and the vehicle.

According to various aspects, one or more or all lane segments, which connect the two vehicles and which form the connecting route between the two vehicles may be calculated based on, for example, the road network data and the vehicles position information. To cover also opposite direction and intersection use-cases, the nominal driving direction on the lanes may be disregarded.

According to various aspects, one situation from the following set of situations may be determined: same direction situation, opposite direction situation, or intersection situation. If both vehicles are driving in the same direction with respect to the connecting route, a non-intersection situation may be determined. This may be done, regardless of whether there are intersections between the two vehicles present, because one vehicle just follows the other, potentially through the intersection. If both vehicles drive in opposite directions and there is no intersection in between, a non-intersection situation may be determined.

Otherwise, the potential future routes of the vehicles may be calculated and combined with each other. Every intersection that may be present in both routes of these combinations might result in a new situation to be created. According to various aspects, if both drive through the intersection coming from the same intersection arm, a non-intersection same direction situation may be created. If the routes of the vehicles are crossing each other within the intersection, an intersection situation may be created. Else, the routes are not crossing and the vehicles pass each other, so a non-intersection opposite direction situation may be created.

According to various aspects, the consideration of intersections may lead to an increase in the number of possible situations that may be considered in a process of the safety module 100. Optionally, to reduce the computational effort of the safety analysis, the situations that represent the same scene may be merged if they apparently describe the same situation (i.e. both vehicles take the same route through the intersection). To achieve this, and still be able to keep the worst-case assessment, the velocities of the vehicles may be described as intervals to provide the minimum and maximum calculated speed components because the route before the intersection might differ.

Figure 8:
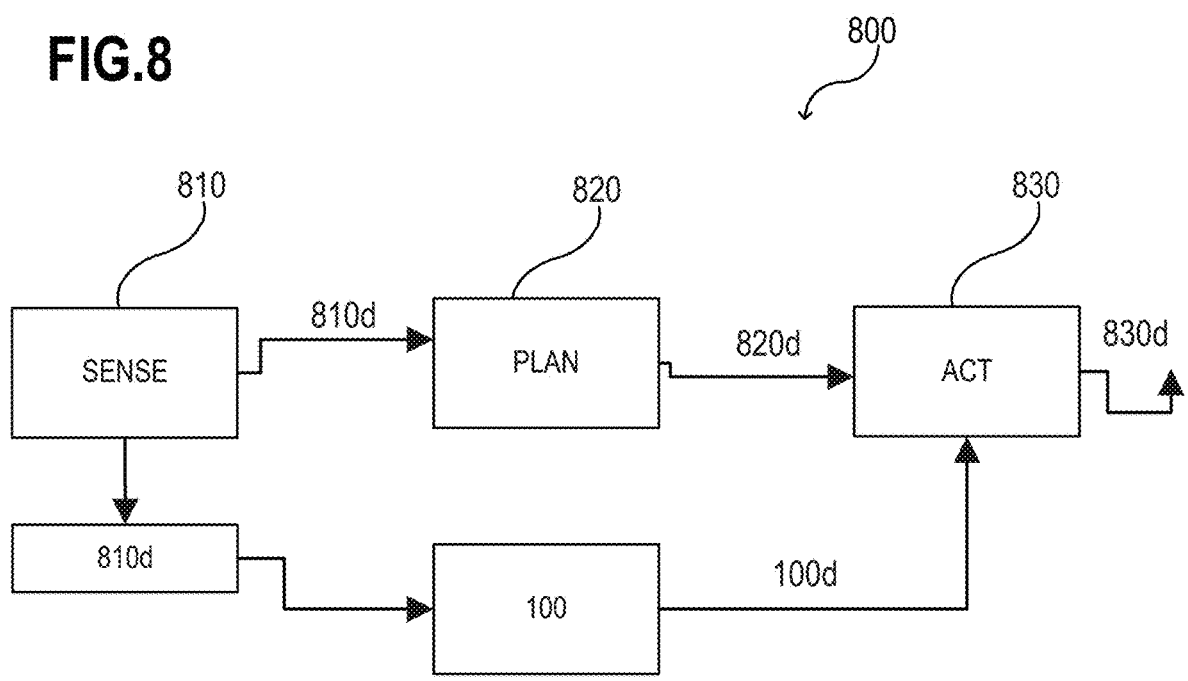
FIG. 8 shows an automated driving system in a schematic view, according to some aspects.

FIG. 8 illustrates an integration of a safety module (e.g., safety module 100 or a suitable RSS module) into an automated driving system 800, according to various aspects. The automated driving system may be implemented in a vehicle or may be communicatively coupled with a vehicle, according to some aspects.

In some aspects, the automated driving system 800 may include a sensing module 810. The sensing module 810 may be configured to create world model data 810*d*. The world model data 810*d* may be used to plan movement of the vehicle based on a model. The automated driving system 800 may further include a planning module 820. The planning module 820 may be configured to create control information 820*d* based on the world model data 810*d*. The control information 820*d* may represent, for example, a trajectory the vehicle should follow. According to various aspects, the automated driving system 800 may further include an acting module 830. The acting module 830 may be configured to transform the control information 820*d* received from planning module 820 the into control commands 830*d*. The control commands 830*d* may include, for example, any suitable signal to steer, throttle, and/or break the vehicle. The control commands 830*d* may be received by any suitable component of the vehicle that is configured to control the vehicle accordingly.

According to various aspects, the automated driving system 800 may include a safety module 100. The safety module 100 may be configured to receive the world model data 810*d* (e.g., including road information and obstacle position information). According to various aspects, the acting module 100 may be instructed by the safety module 100 to perform one or more safety operations if necessary. As an example, in the case that the safety module 100 has determined a likelihood of a potential collision, the safety module 100 may be configured to send an instruction signal 100*d* to the acting module 100 to prevent the collision.

According to various aspects, the sensing module 810 may be configured to determine a minimal safety distance from the world model data. The minimal safety distance may be used for a comparison with an actual distance between the vehicle and an obstacle and, the one or more safety operations may be instructed in the case that the actual distance is at or below the minimal safety distance.

FIG. 9 shows a schematic flow diagram of a safety method 900, according to various aspects. The method 900 may include, in 910, determining a lane coordinate system based on road information, the lane coordinate system including a plurality of lane segments arranged along a longitudinal direction and along a lateral direction of the lane coordinate system. The method 900 may include, in 920, determining length information and width information for each of the lane segments from the road information. The method 900 may include, in 930, assigning the determined length information and width information to each of the respective lane segments, the length information representing a minimal length and a maximal length of the respective lane segment as a function of a curvature of a corresponding part of the one or more roads, and the width information representing a minimal width and a maximal width of the respective lane segment as a function of a variable width of a corresponding part of the one or more roads. The method 900 may include, in 940, determining a position of an obstacle relative to an ego-vehicle in the determined lane coordinate system based on obstacle position information. The method 900 may include, in 950, determining a potential collision event based on the determined relative position of the obstacle. The method 900 may include, in 960, instructing a safety operation in the case that the potential collision event is determined to avoid a potential collision.

In the following, various examples are provided that are related to the aspects described above and illustrated in the figures.

Example 1 is a safety module, including: one or more processors configured to receive road information representing a geometry of one or more roads and obstacle position information associated with a position of an obstacle on the one or more roads, determine a lane coordinate system based on the received road information, the lane coordinate system including a plurality of lane segments arranged along a longitudinal direction and along a lateral direction of the lane coordinate system, wherein a length information and a width information are assigned to each of the lane segments, the length information representing a minimal length and a maximal length of the respective lane segment as a function of a curvature of a corresponding part of the one or more roads, and the width information representing a minimal width and a maximal width of the respective lane segment as a function of a variable width of a corresponding part of the one or more roads; determine a position of the obstacle relative to an ego-vehicle in the lane coordinate system based on the received obstacle position information; determine a potential collision event based on the determined relative position of the obstacle; and instruct a safety operation in the case that the potential collision event is determined to avoid a potential collision.

In other aspects, a safety module may include: one or more processors configured to receive road information representing a geometry of one or more roads in a Cartesian coordinate system, determine a lane coordinate system based on the received road information, the lane coordinate system including a plurality of lane segments arranged along a longitudinal direction and along a lateral direction of the lane coordinate system, wherein a length information and a width information are assigned to each of the lane segments, the length information representing a minimal length and a maximal length of the respective lane segment as a function of a curvature of a corresponding part of the one or more roads in the Cartesian coordinate system, and the width information representing a minimal width and a maximal width of the respective lane segment as a function of a variable width of a corresponding part of the one or more roads in the Cartesian coordinate system; determine a potential collision event based on the lane coordinate system; and instruct a safety operation if the potential collision event is determined to avoid a potential collision. The one or more processors of the safety module may be further configured to determine an area of interest in the lane coordinate system, the area of interest including a set of lane segments assigned thereto, wherein the ego-vehicle and an obstacle are positioned in the area of interest.

In Example 2, the safety module of Example 1 may optionally further include that the road information represents the geometry of the one or more roads in a Cartesian coordinate system.

In Example 3, the safety module of Example 1 or 2 may optionally further include that the one or more processors are further configured to determine a road area of interest in the lane coordinate system, the road area of interest including a set of lane segments assigned thereto, wherein the ego-vehicle and the obstacle are positioned in the road area of interest.

In Example 4, the safety module of Example 3 may optionally further include that the determination of the road area of interest includes determining each lane segment between the ego-vehicle and the obstacle in the longitudinal direction and in the lateral direction.

In Example 5, the safety module of Example 3 or 4 may optionally further include that the one or more processors are configured to determine an ego-vehicle parametric bounding box for each of one or more lane segments of the road area of interest, the ego-vehicle parametric bounding box representing a space occupied by the ego-vehicle.

In Example 6, the safety module of any one of Examples 3 to 5 may optionally further include that the one or more processors are configured to determine an obstacle parametric bounding box for each of one or more lane segments of the road area of interest, the obstacle parametric bounding box representing a space occupied by the obstacle.

In Example 7, the safety module of any one of Examples 3 to 5 may optionally further include that the set of lane segments assigned to the road area of interest includes an origin road segment, the origin road segment having one or more lane segments arranged along the lateral direction assigned thereto, wherein the ego-vehicle is positioned in at least one of the one or more lane segments assigned to the origin road segment, and/or that the road area of interest includes a maximal road segment having one or more lane segments arranged along the lateral direction assigned thereto, wherein the obstacle is positioned in at least one of the one or more lane segments assigned to the maximal road segment.

In Example 8, the safety module of any one of Examples 3 to 7 may optionally further include that the road area of interest includes an origin lane having one or more lane segments arranged along the longitudinal direction assigned thereto, wherein the ego-vehicle is positioned in at least one of the one or more lane segments assigned to the origin lane, and/or that the road area of interest includes a maximal lane having one or more lane segments arranged along the longitudinal direction assigned thereto, wherein the obstacle is positioned in at least one of the one or more lane segments assigned to the maximal lane.

In Example 9, the safety module of any one of Examples 3 to 8 may optionally further include that the one or more processors are further configured to determine a minimal length and a maximal length of the road area of interest.

In Example 10, the safety module of any one of Examples 3 to 9 may optionally further include that the one or more processors are further configured to determine a minimal width and a maximal width of the road area of interest.

In Example 11, the safety module of any one of Examples 3 to 10 may optionally further include that the one or more processors are configured to determine a driving direction for one or more or all lane segments assigned to the road area of interest.

In Example 12, the safety module of any one of Examples 1 to 11 may optionally further include that the obstacle is at least one of the following: a traffic infrastructure or a part of a traffic infrastructure, a pedestrian, or a vehicle.

In Example 13, the safety module of any one of Examples 1 to 12 may optionally further include that the one or more processors are further configured to determine the potential collision event via a model-based approach.

In Example 14, the safety module of any one of Examples 1 to 13 may optionally further include that the potential collision event is determined in the case that a minimal distance between the ego-vehicle and the obstacle is at or below a minimal safety distance.

In Example 15, the safety module of any one of Examples 1 to 14 may optionally further include that the obstacle is a vehicle and that the one or more processors are further configured to determine presence of at least one of the following situations: a same direction situation representing the ego-vehicle and the vehicle are driving in the same direction with respect to a connecting route, an opposite direction situation representing the ego-vehicle and the vehicle are driving in opposite directions with respect to a connecting route and no intersection is in between the ego-vehicle and the vehicle, and/or an intersection situation representing the ego-vehicle and the vehicle are driving in the same direction or in opposite directions with respect to one or more connecting routes and one or more intersections are in between the ego-vehicle and the vehicle.

In Example 16, the safety module of any one of Examples 1 to 15 may optionally further include that the obstacle is a vehicle and that the one or more processors are further configured determine presence of a crossing routes intersection situation presenting the ego-vehicle and the vehicle are driving through the same intersection with crossing routes.

In Example 17, the safety module of Example 16 may optionally further include that in the case that a crossing routes intersection situation is determined, the one or more processors are further configured to determine a first area of interest and a second area of interest in the lane coordinate system, the first area of interest including a first set of lane segments assigned thereto, wherein the ego-vehicle and the intersection are positioned in the first area of interest, the second area of interest including a second set of lane segments assigned thereto, wherein the vehicle and the intersection are positioned in the second area of interest.

In Example 18, the safety module of Example 17 may optionally further include that the one or more processors are further configured to determine a first intersection distance based on the first area of interest, determine a second intersection distance based on the second area of interest, and determine a longitudinal distance between the ego-vehicle and the vehicle based on the determined first intersection distance and the determined second intersection distance.

Example 19 is an automated driving system, including: a sensing module configured to create world model data; a planning module configured to create control information based on the world model data; and an acting module configured to transform the control information into control commands; and a safety module of any one of claims 1 to 9 configured to receive the world model data, the world model data representing the road information and the obstacle position information, wherein the acting module is instructed to perform the safety operation. The control information may include, for example, a trajectory a vehicle should follow. The control commands may include, for example, any command that may be used to steer, throttle and break the vehicle.

In Example 20, the automated driving system of Example 19 may optionally further include that the sensing module is configured to determine a minimal safety distance from the world model data. The safety module of the automated driving system may be configured to determine the potential collision event based on the minimal safety distance.

Example 21 is a method, including: determining a lane coordinate system based on road information, the lane coordinate system including a plurality of lane segments arranged along a longitudinal direction and along a lateral direction of the lane coordinate system; determining length information and width information for each of the lane segments from the road information; assigning the determined length information and width information to each of the respective lane segments, the length information representing a minimal length and a maximal length of the respective lane segment as a function of a curvature of a corresponding part of the one or more roads, and the width information representing a minimal width and a maximal width of the respective lane segment as a function of a variable width of a corresponding part of the one or more roads; determining a position of an obstacle relative to an ego-vehicle in the determined lane coordinate system based on obstacle position information; determining a potential collision event based on the determined relative position of the obstacle; and instructing a safety operation in the case that the potential collision event is determined to avoid a potential collision.

In Example 22, the method of Example 21 may optionally further include that the road information represents the geometry of the one or more roads in a Cartesian coordinate system.

In Example 23, the method of Example 21 or 22 may optionally further include: determining a road area of interest in the lane coordinate system, the road area of interest including a set of lane segments assigned thereto, wherein the ego-vehicle and the obstacle are positioned in the road area of interest.

In Example 24, the method of Example 23 may optionally further include that the determination of the road area of interest includes determining each lane segment between the ego-vehicle and the obstacle in longitudinal direction and in lateral direction.

In Example 25, the method of Example 23 or 24 may optionally further include: determining an ego-vehicle parametric bounding box for each of one or more lane segments of the road area of interest, the ego-vehicle parametric bounding box representing a space occupied by the ego-vehicle.

In Example 26, the method of any one of Examples 23 to 25 may optionally further include: determining an obstacle parametric bounding box for each of one or more lane segments of the road area of interest, the obstacle parametric bounding box representing a space occupied by the obstacle.

In Example 27, the method of any one of Examples 23 to 26 may optionally further include that the set of lane segments assigned to the road area of interest includes an origin road segment, the origin road segment including one or more lane segments along the lateral direction assigned thereto, wherein the ego-vehicle is positioned in at least one of the one or more lane segments assigned to the origin road segment, and/or that the road area of interest includes a maximal road segment including one or more lane segments along the lateral direction assigned thereto, wherein the obstacle is positioned in at least one of the one or more lane segments assigned to the maximal road segment.

In Example 28, the method of any one of Examples 23 to 27 may optionally further include that the road area of interest includes an origin lane including one or more lane segments along the longitudinal direction assigned thereto, wherein the ego-vehicle is positioned in at least one of the one or more lane segments assigned to the origin lane, and/or that the road area of interest includes a maximal lane including one or more lane segments along the longitudinal direction assigned thereto, wherein the obstacle is positioned in at least one of the one or more lane segments assigned to the maximal lane.

In Example 29, the method of any one of Examples 23 to 28 may optionally further include: determining a minimal length and a maximal length of the road area of interest, and/or determining a minimal width and a maximal width of the road area of interest.

In Example 30, the method of any one of Examples 23 to 29 may optionally further include: determining a driving direction for one or more or all lane segments assigned to the road area of interest.

In Example 31, the method of any one of Examples 21 to 30 may optionally further include that the obstacle is at least one of the following: a traffic infrastructure or a part of a traffic infrastructure, a pedestrian, or a vehicle.

In Example 32, the method of any one of Examples 21 to 31 may optionally further include: determining the potential collision event via a model-based approach.

In Example 33, the method of any one of Examples 21 to 32 may optionally further include that the potential collision event is determined in the case that a minimal distance between the ego-vehicle and the obstacle is at or below a minimal safety distance.

In Example 34, the method of any one of Examples 21 to 33 may optionally further include that the obstacle is a vehicle; and: determining presence of at least one of the following situations: a same direction situation representing the ego-vehicle and the vehicle are driving in the same direction with respect to a connecting route, an opposite direction situation representing the ego-vehicle and the vehicle are driving in opposite directions with respect to a connecting route and no intersection is in between the ego-vehicle and the vehicle, and/or an intersection situation representing the ego-vehicle and the vehicle are driving in the same direction or in opposite directions with respect to one or more connecting routes and one or more intersections are in between the ego-vehicle and the vehicle.

In Example 35, the method of any one of Examples 21 to 34 may optionally further include that the obstacle is a vehicle and: determining presence of an crossing routes intersection situation presenting the ego-vehicle and the vehicle are driving through the same intersection with crossing routes.

In Example 36, the method of Example 35 may optionally further include that in the case that a crossing routes intersection situation is determined, the method further includes: determining a first area of interest and a second area of interest in the lane coordinate system, the first area of interest including a first set of lane segments assigned thereto, wherein the ego-vehicle and the intersection are positioned in the first area of interest, the second area of interest including a second set of lane segments assigned thereto, wherein the vehicle and the intersection are positioned in the second area of interest.

In Example 37, the method of Example 36 may optionally further include: determining a first intersection distance based on the first area of interest, determining a second intersection distance based on the second area of interest, and determining a longitudinal distance between the ego-vehicle and the vehicle based on the determined first intersection distance and the determined second intersection distance.

In some aspects, any method described herein may be partially or completely implemented as a non-transitory computer readable medium with program instructions, which when executed, cause one or more processors to perform at least a portion or all of the method.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A safety module used in an automated driving system, comprising:
    one or more processors configured to:
        receive road information representing a geometry of one or more roads and obstacle position information associated with a position of an obstacle on the one or more roads,
        determine a lane coordinate system based on the received road information, the lane coordinate system comprising a plurality of lane segments arranged along a longitudinal direction and along a lateral direction of the lane coordinate system, wherein a length information and a width information are assigned to each of the plurality of lane segments, the length information representing a minimal length and a maximal length of the respective lane segment as a function of a curvature of a corresponding part of the one or more roads, and the width information representing a minimal width and a maximal width of the respective lane segment as a function of a variable width of a corresponding part of the one or more roads;
        determine a position of the obstacle relative to an ego-vehicle in the lane coordinate system based on the obstacle position information;
        determine a potential collision event based on the determined relative position of the obstacle; and
        instruct a safety operation in the case that the potential collision event is determined to avoid a potential collision.

2. The safety module of claim 1,
    wherein the road information represents the geometry of the one or more roads in a Cartesian coordinate system.

3. The safety module of claim 1,
    wherein the one or more processors are further configured to determine a road area of interest in the lane coordinate system, the road area of interest comprising a set of lane segments assigned thereto, wherein the ego-vehicle and the obstacle are positioned in the road area of interest.

4. The safety module of claim 3,
wherein the determination of the road area of interest comprises determining each lane segment between the ego-vehicle and the obstacle in the longitudinal direction and in the lateral direction.

5. The safety module of claim 3,
wherein the one or more processors are configured to determine an ego-vehicle parametric bounding box for each of one or more lane segments of the road area of interest, the ego-vehicle parametric bounding box representing a space occupied by the ego-vehicle; and/or
wherein the one or more processors are configured to determine an obstacle parametric bounding box for each of one or more lane segments of the road area of interest, the obstacle parametric bounding box representing a space occupied by the obstacle.

6. The safety module of claim 3,
wherein the set of lane segments assigned to the road area of interest comprises an origin road segment, the origin road segment comprising one or more lane segments along the lateral direction assigned thereto, wherein the ego-vehicle is positioned in at least one of the one or more lane segments assigned to the origin road segment, and
wherein the road area of interest comprises a maximal road segment comprising one or more lane segments along the lateral direction assigned thereto, wherein the obstacle is positioned in at least one of the one or more lane segments assigned to the maximal road segment.

7. The safety module of claim 3,
wherein the road area of interest comprises an origin lane having one or more lane segments along the longitudinal direction assigned thereto, wherein the ego-vehicle is positioned in at least one of the one or more lane segments assigned to the origin lane, and
wherein the road area of interest comprises a maximal lane having one or more lane segments along the longitudinal direction assigned thereto, wherein the obstacle is positioned in at least one of the one or more lane segments assigned to the maximal lane.

8. The safety module of claim 3,
wherein the one or more processors are further configured to determine a minimal length and a maximal length of the road area of interest, and/or
wherein the one or more processors are further configured to determine a minimal width and a maximal width of the road area of interest.

9. The safety module of claim 1,
wherein the obstacle is at least one of the following:
a traffic infrastructure or a part of a traffic infrastructure,
a pedestrian, or
a vehicle.

10. The safety module of claim 1,
wherein the one or more processors are further configured to determine the potential collision event via a model-based approach; and
wherein the potential collision event is determined in the case that a minimal distance between the ego-vehicle and the obstacle is at or below a minimal safety distance.

11. The safety module of claim 1,
wherein the obstacle is a vehicle and wherein the one or more processors are further configured to determine presence of at least one of the following situations:

a same direction situation representing the ego-vehicle and the vehicle are driving in the same direction with respect to a connecting route,
an opposite direction situation representing the ego-vehicle and the vehicle driving in opposite directions with respect to a connecting route and no intersection is in between the ego-vehicle and the vehicle, or
an intersection situation representing the ego-vehicle and the vehicle are driving in the same direction or in opposite directions with respect to one or more connecting routes and one or more intersections are in between the ego-vehicle and the vehicle.

12. The safety module of claim 1,
wherein the obstacle is a vehicle and wherein the one or more processors are further configured to determine a presence of a crossing routes intersection situation presenting the ego-vehicle and the vehicle driving through an intersection with crossing routes; and
wherein in the case that the crossing routes intersection situation is determined,
the one or more processors are further configured to determine a first area of interest and a second area of interest in the lane coordinate system, the first area of interest comprising a first set of lane segments assigned thereto, wherein the ego-vehicle and the intersection are positioned in the first area of interest, the second area of interest comprising a second set of lane segments assigned thereto, wherein the vehicle and the intersection are positioned in the second area of interest.

13. The safety module of claim 12,
wherein the one or more processors are further configured to
determine a first intersection distance based on the first area of interest,
determine a second intersection distance based on the second area of interest, and
determine a longitudinal distance between the ego-vehicle and the vehicle based on the determined first intersection distance and the determined second intersection distance.

14. An automated driving system, comprising:
a sensing module configured to create world model data;
a planning module configured to create control information based on the world model data;
an acting module configured to transform the control information into control commands; and
a safety module used in an automated driving system, comprising:
one or more processors configured to:
receive road information representing a geometry of one or more roads and obstacle position information associated with a position of an obstacle on the one or more roads,
determine a lane coordinate system based on the received road information, the lane coordinate system comprising a plurality of lane segments arranged along a longitudinal direction and along a lateral direction of the lane coordinate system, wherein a length information and a width information are assigned to each of the plurality of lane segments, the length information representing a minimal length and a maximal length of the respective lane segment as a function of a curvature of a corresponding part of the one or more roads, and the width information representing a minimal width and a maximal width of the respective lane segment as a function of a variable width of a corresponding part of the one or more roads;
determine a position of the obstacle relative to an ego-vehicle in the lane coordinate system based on the obstacle position information;
determine a potential collision event based on the determined relative position of the obstacle; and
instruct a safety operation in the case that the potential collision event is determined to avoid a potential collision;
wherein the safety module is configured to receive the world model data, the world model data representing the road information and the obstacle position information, and
wherein the safety module is configured to instruct the acting module to perform the safety operation.

15. The automated driving system of claim 14,
wherein a sensing module configured to determine a minimal safety distance from the world model data and wherein the safety module is configured to determine a potential collision event based on the determined minimal safety distance.

16. The safety module of claim 1, wherein the minimal length is different from the maximal length of the respective lane segment; and wherein the minimal width is different from the maximal width of the respective lane segment.

17. The safety module of claim 1, wherein a coordinate corresponding to an upper longitudinal boundary of a lane segment is described by at least a first maximum y coordinate and a first minimum y coordinate ($y_{max1}$, $y_{min1}$);
wherein a coordinate corresponding to a lower longitudinal boundary of a lane segment is described by at least a second maximum y coordinate and a second minimum y coordinate ($y_{max2}$, $y_{min2}$);
wherein a coordinate corresponding to an upper lateral boundary of a lane segment is described by at least a first maximum x coordinate and a first minimum x coordinate ($y_{max1}$, $y_{min1}$); and
wherein a coordinate corresponding to a lower longitudinal boundary of a lane segment is described by at least a second maximum x coordinate and a second minimum x coordinate ($y_{max2}$, $y_{min2}$).

18. A safety module used in an automated driving system, comprising:
one or more processors configured to:
receive road information representing a geometry of one or more roads in a Cartesian coordinate system,
determine a lane coordinate system based on the received road information, the lane coordinate system comprising a plurality of lane segments arranged along a longitudinal direction and along a lateral direction of the lane coordinate system, wherein a length information and a width information are assigned to each of the plurality of lane segments, the length information representing a minimal length and a maximal length of the respective lane segment as a function of a curvature of a corresponding part of the one or more roads in the Cartesian coordinate system, and the width information representing a minimal width and a maximal width of the respective lane segment as a function of a variable width of a corresponding part of the one or more roads in the Cartesian coordinate system,
determine a potential collision event based on the lane coordinate system; and
instruct a safety operation in the case that the potential collision event is determined to avoid a potential collision.

19. The safety module of claim 18,
wherein the one or more processors are further configured to determine an area of interest in the lane coordinate system, the area of interest comprising a set of lane segments assigned thereto, wherein the ego-vehicle and the obstacle are positioned in the area of interest.

20. A safety method for use with an automated driving system, comprising:
determining a lane coordinate system based on road information, the lane coordinate system comprising a plurality of lane segments arranged along a longitudinal direction and along a lateral direction of the lane coordinate system;
determining length information and width information for each of the lane segments from the road information;
assigning the determined length information and width information to each of the respective lane segments, the length information representing a minimal length and a maximal length of the respective lane segment as a function of a curvature of a corresponding part of the one or more roads, and the width information representing a minimal width and a maximal width of the respective lane segment as a function of a variable width of a corresponding part of the one or more roads;
determining a position of an obstacle relative to an ego-vehicle in the determined lane coordinate system based on obstacle position information;
determining a potential collision event based on the determined relative position of the obstacle; and
instructing a safety operation in the case that the potential collision event is determined to avoid a potential collision.

* * * * *